United States Patent
Shi et al.

(10) Patent No.: US 12,492,125 B2
(45) Date of Patent: *Dec. 9, 2025

(54) METHODS FOR PREPARING HARD CARBON PRODUCTS BY SULFURIZATION AND OXIDATION PROCESSES

(71) Applicant: PHILLIPS 66 COMPANY, Houston, TX (US)

(72) Inventors: Dachuan Shi, Bartlesville, OK (US); Alexander Z. Wilbee, Bartlesville, OK (US); Paul M. Schmidt, Bartlesville, OK (US); Liang Zhang, Owasso, OK (US); Kan Huang, Sterling Heights, MI (US); Jonathan R. Marda, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 703 days.

This patent is subject to a terminal disclaimer.

(21) Appl. No.: 17/873,422

(22) Filed: Jul. 26, 2022

(65) Prior Publication Data

US 2023/0047084 A1 Feb. 16, 2023

Related U.S. Application Data

(60) Provisional application No. 63/304,811, filed on Jan. 31, 2022, provisional application No. 63/304,877, filed on Jan. 31, 2022, provisional application No. 63/230,868, filed on Aug. 9, 2021.

(51) Int. Cl.
  *C01B 32/05* (2017.01)
  *C10G 29/02* (2006.01)
  *H01M 4/587* (2010.01)

(52) U.S. Cl.
  CPC .............. *C01B 32/05* (2017.08); *C10G 29/02* (2013.01); *H01M 4/587* (2013.01); *C01P 2002/72* (2013.01); *C01P 2006/40* (2013.01)

(58) Field of Classification Search
  CPC ......... C01B 32/05; C10G 29/02; H01M 4/587
  See application file for complete search history.

(56) References Cited

U.S. PATENT DOCUMENTS

| 2,681,318 | A | * | 6/1954 | Mayer | .................... C01B 32/33 |
| | | | | | 502/433 |
| 3,788,978 | A | * | 1/1974 | Bearden | .................... C25C 3/02 |
| | | | | | 208/208 M |
| 3,917,806 | A | | 11/1975 | Amagi et al. | |
| 2018/0258027 | A1 | | 9/2018 | Siddiqui | |
| 2020/0299141 | A1 | | 9/2020 | Du et al. | |

FOREIGN PATENT DOCUMENTS

| EP | 1739771 | 8/2013 |
| EP | 3358656 | 12/2019 |
| JP | H05155673 | 6/1993 |
| WO | 2020186195 | 9/2020 |
| WO | 2021030290 | 2/2021 |

OTHER PUBLICATIONS

International Application No. PCT/US2022/038353, International Filing Date Jul. 26, 2022, Notification of Transmittal of the International Search Report and the Written Opinion of the International Searching Authority, or the Declaration, 32 pages.

* cited by examiner

*Primary Examiner* — Stuart L Hendrickson
(74) *Attorney, Agent, or Firm* — Phillips 66 Company

(57) ABSTRACT

Embodiments of the present disclosure generally relate to methods for preparing carbon materials which can be used in battery electrodes. More specifically, embodiments relate to methods for preparing hard carbon materials used as anode materials in metal-ion batteries, such as a sodium-ion battery. In one or more embodiments, a method includes exposing a liquid refinery hydrocarbon product to a first functionalization agent containing sulfur to produce a first solid functionalized product containing sulfur during a first functionalization process. The method further includes purifying the first solid functionalized product during a purification process and exposing the first solid functionalized product to a second functionalization agent containing oxygen to produce a second solid functionalized product containing sulfur and oxygen during a second functionalization process. The method also includes carbonizing the second solid functionalized product to produce a hard carbon product during a carbonization process.

19 Claims, 9 Drawing Sheets

METHODS FOR PREPARING HARD CARBON PRODUCTS BY SULFURIZATION AND OXIDATION PROCESSES

CROSS-REFERENCE TO RELATED APPLICATIONS

This application is a Non-Provisional Patent Application which claims the benefit of and priority to U.S. Provisional Application Ser. No. 63/230,868 filed Aug. 9, 2021 entitled "Multi Functionalization of Petroleum Products", U.S. Provisional Application Ser. No. 63/304,811 filed Jan. 31, 2022, entitled "Methods for Preparing Nano-Ordered Carbon Products from Petroleum Streams", and U.S. Provisional Application Ser. No. 63/304,877 filed Jan. 31, 2022, entitled "Methods for Preparing Hard Carbon Products by Sulfurization and Oxidation Processes" all of which are hereby incorporated by reference in their entirety.

BACKGROUND

Field

Embodiments of the present disclosure generally relate to battery technology, and more specifically, methods for preparing carbon-based materials used in battery technology.

In recent years, large secondary batteries with high energy density and excellent output characteristics are being mounted in electric vehicles in response to increasing concern over environmental issues. Lithium-ion battery technology has enjoyed a lot of attention in recent years and provides the preferred portable battery for most electronic devices in use today. However, lithium is not a cheap metal to source and is considered too expensive for use in large scale battery applications. By contrast sodium-ion battery technology is still in a relative infancy stage but is seen as having many advantages over lithium. Sodium is a more abundant element than lithium. As such, some researchers predict sodium-ion batteries will provide a cheaper and more durable way to store energy into the future, particularly for large scale applications such as storing energy on the electrical grid. Nevertheless, a lot of work has to be done before sodium-ion batteries are a commercial reality.

Sodium-ion batteries are analogous in many ways to the lithium-ion batteries that are in common use today. Both types of batteries are reusable secondary batteries that include an anode (negative electrode), a cathode (positive electrode), and an electrolyte material. Also, both types of batteries are capable of charging and discharging via a similar reaction mechanism. When a sodium-ion (or lithium-ion) battery is charging, the metal ions (Na+ or Li+) de-intercalate from the cathode and insert into the anode. Meanwhile charge balancing electrons pass from the cathode through the external circuit containing the charger and into the anode of the battery. During discharge but the metal ions and balancing electrons flow in the opposite direction.

Hard carbon with nano-ordered structure is considered so far the most commercially promising anode materials for sodium ion batteries. This material has been conventionally derived from biomass feedstocks that contain significant amounts of oxygen. These feedstocks are difficult to collect due to localized nature, difficult to process due to large amount of impurities, and challenging to control quality which leads to inconsistent product. In addition, the yield from these feedstocks are known to be low, such as about 10%-20%.

Heavy refinery hydrocarbon streams such as petroleum streams are ideal as natural building blocks for value-added carbonaceous materials in batteries. Conventional approaches to making hard carbon products from petroleum-based feedstock usually are carried out via a lengthy process. For example, a hard carbon material can be made from a petroleum pitch by mixing the pitch with an additive in a heated molten state followed by extruding into pellets, emulsification into micro-sized particles, removing additives by solvent washing, air oxidation in fluidized bed reactor, and calcining in high temperature furnace.

Therefore, there is a need for improved methods to prepare hard carbon materials capable of having high specific capacity and ideal structural parameters, and where the methods are faster, more efficient, and produce greater yields than traditional methods for preparing similar carbon materials.

SUMMARY

Embodiments of the present disclosure generally relate to methods for preparing carbon materials which can be used in battery electrodes. More specifically, embodiments relate to methods for preparing solid nano-ordered carbon (NOC) products, such as hard carbon, from hydrocarbon streams which are multi-functionalized by processes described and discussed herein. The solid nano-ordered carbon products can be used as anode materials in metal-ion batteries, such as a sodium-ion battery.

In one or more embodiments, a method for preparing a nano-ordered carbon product is provided and includes exposing a liquid refinery hydrocarbon product, such as a petroleum product, to a first functionalization agent to produce a first solid functionalized product during a first functionalization process, where each of the first functionalization agent and the first solid functionalized product contains sulfur. The method further includes purifying the first solid functionalized product during a purification process and exposing the first solid functionalized product to a second functionalization agent to produce a second solid functionalized product during a second functionalization process. The second functionalization agent contains oxygen, and the second solid functionalized product contains sulfur and oxygen. The method also includes carbonizing the second solid functionalized product to produce a hard carbon product during a carbonization process.

In other embodiments, a method for preparing a solid nano-ordered carbon is provided and includes heating an initial refinery hydrocarbon product to remove a light hydrocarbon cut from a liquid refinery hydrocarbon product during a fractionation process. The light hydrocarbon cut has a boiling point of about 50° C. to about 370° C. and the liquid refinery hydrocarbon product has a boing point of greater than 370° C. The method also includes exposing the liquid refinery hydrocarbon product to a first functionalization agent to produce a first solid functionalized product during a first functionalization process. Each of the first functionalization agent and the first solid functionalized product contains sulfur. The method further includes purifying the first solid functionalized product by a solvent extraction during a purification process and exposing the first solid functionalized product to a second functionalization agent to produce a second solid functionalized product during a second functionalization process. The second functionalization agent contains oxygen, and the second solid functionalized product contains sulfur and oxygen. The method also includes carbonizing the second solid functionalized product to produce a hard carbon product during a carbonization process.

In some embodiments, a method for preparing a nano-ordered carbon product is provided and includes exposing a liquid refinery hydrocarbon product to a first functionalization agent to produce a first solid functionalized product comprising sulfur during a first functionalization process. The first functionalization agent contains elemental sulfur ($S_8$), carbon disulfide, one or more thiols, one or more organic sulfides, or any combination thereof. The method further includes purifying the first solid functionalized product during a purification process and exposing the first solid functionalized product to a second functionalization agent to produce a second solid functionalized product during a second functionalization process. The second functionalization agent contains oxygen gas ($O_2$), air, or oxygen-enriched air and the second solid functionalized product contains sulfur and oxygen. The method also includes carbonizing the second solid functionalized product to produce a hard carbon product during a carbonization process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawing. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the Figures. It is contemplated that elements and features of one or more embodiments may be beneficially incorporated in other embodiments.

DETAILED DESCRIPTION

Figure 1:
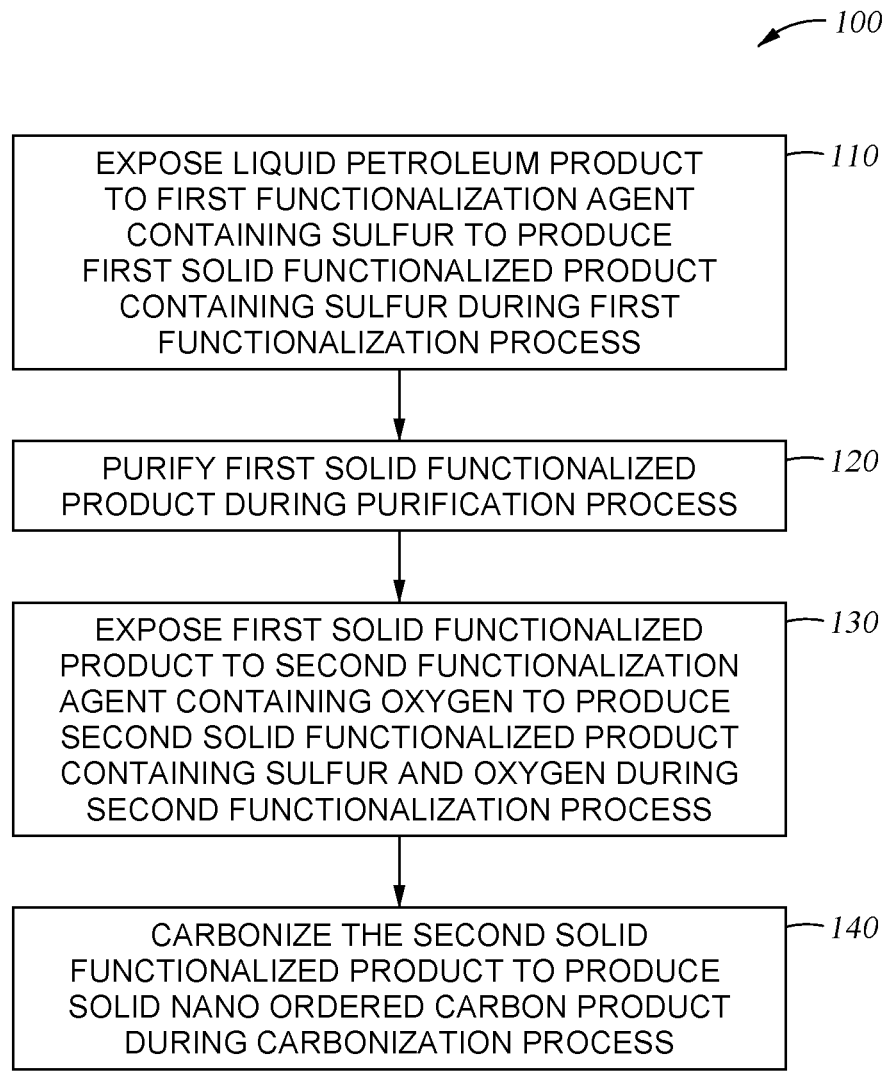
FIG. 1 is a flowchart illustrating a method for preparing solid nano-ordered carbon products, according to one or more embodiments described and discussed herein.

Embodiments of the present disclosure generally relate to methods for preparing carbon materials which can be used in battery electrodes. More specifically, embodiments relate to methods for preparing solid nano-ordered carbon products from hydrocarbon streams which are functionalized by sulfurization and oxidation processes described and discussed herein. The solid nano-ordered carbon products, such as hard carbon products, can be used as anode materials in metal-ion batteries, such as a sodium-ion battery.

A method is taught for preparing a nano-ordered carbon product, comprising exposing a liquid refinery hydrocarbon product to a first functionalization agent to produce a first solid functionalized product during a first functionalization process, wherein each of the first functionalization agent and the first solid functionalized product comprises sulfur. The method can then purify the first solid functionalized product during a purification process. The method also exposes the first solid functionalized product to a second functionalization agent to produce a second solid functionalized product during a second functionalization process, wherein the second functionalization agent comprises oxygen, and wherein the second solid functionalized product comprises sulfur and oxygen. The method can also carbonize the second solid functionalized product to produce a hard carbon product during a carbonization process.

In one embodiment, the liquid refinery hydrocarbon product comprises a fluid catalytic cracking (FCC) slurry oil, a heavy hydrocarbon stream comprising polyaromatic hydrocarbons, a coker gas oil, a vacuum or distillation gas oil, an ethylene tar, a coal tar, a cracking fluid, or any combination thereof. In yet another embodiment, the liquid refinery hydrocarbon product has a boiling point of about 260° C. to about 704° C., an average molecular weight of about 100 to about 400, and an average number of aromatic rings of 2 to about 10.

In one embodiment, the first functionalization process comprises a sulfurization process. In yet another embodiment, a reaction mixture comprising the liquid refinery hydrocarbon product and the first functionalization agent is heated to a process temperature of about 100° C. to about 400° C. during the first functionalization process.

In one embodiment, the first functionalization agent comprises elemental sulfur ($S_8$), carbon disulfide, a thiol, an organic sulfide, a metal sulfide, or any combination thereof. In yet another embodiment, the first solid functionalized product comprises about 10 wt % to about 50 wt % of sulfur. In yet another embodiment, the first solid functionalized product is exposed to a solvent extraction during the purification process.

In one embodiment, a contaminant is separated from the first solid functionalized product during the purification process, and wherein the contaminant comprises an aromatic or polyaromatic compound with one or more long side chains, a paraffinic compound, or a combination thereof. In another embodiment, the second functionalization agent is selected from the group consisting of oxygen gas ($O_2$), air, or oxygen-enriched air, hydrogen peroxide, sulfuric acid, nitric acid, and combinations thereof.

In one embodiment a reaction mixture comprising the first solid functionalized product and the second functionalization agent is heated to a process temperature of about 200° C. to about 400° C. during the second functionalization process. In another embodiment the first functionalization agent comprises elemental sulfur ($S_8$), and wherein the second functionalization agent comprises oxygen gas ($O_2$), air, or oxygen-enriched air. In yet another embodiment, the second solid functionalized product comprises about 10 wt % to about 25 wt % of sulfur and about 5 wt % to about 30 wt % of oxygen.

In one embodiment, the second solid functionalized product is heated to a temperature of about 1,000° C. to about 2,900° C. during the carbonization process. In yet another embodiment, prior to the first functionalization process, further comprising exposing an initial refinery hydrocarbon product to a fractionation process to remove a light hydrocarbon cut and produce the liquid refinery hydrocarbon product.

In one embodiment, the light hydrocarbon cut has a boiling point of about 50° C. to about 370° C. and the liquid refinery hydrocarbon product has a boing point of greater than 370° C.

A method is also taught of preparing a solid nano-ordered carbon, comprising: heating an initial refinery hydrocarbon product to remove a light hydrocarbon cut from a liquid refinery hydrocarbon product during a fractionation process, wherein the light hydrocarbon cut has a boiling point of about 50° C. to about 370° C. and the liquid refinery hydrocarbon product has a boing point of greater than 370° C. The method can expose the liquid refinery hydrocarbon product to a first functionalization agent to produce a first solid functionalized product during a first functionalization process, wherein each of the first functionalization agent and the first solid functionalized product comprises sulfur. The method also purifies the first solid functionalized product by a solvent extraction during a purification process. In one method exposing the first solid functionalized product to a second functionalization agent to produce a second solid functionalized product during a second functionalization process, wherein the second functionalization agent comprises oxygen, and wherein the second solid functionalized product comprises sulfur and oxygen. The method can also carbonize the second solid functionalized product to produce a hard carbon product during a carbonization process.

In one embodiment, the first functionalization agent comprises elemental sulfur ($S_8$), and wherein the second functionalization agent comprises oxygen gas ($O_2$), air, or oxygen-enriched air. In another embodiment, the second solid functionalized product comprises about 10 wt % to about 25 wt % of sulfur and about 5 wt % to about 30 wt % of oxygen.

In one method, a method for preparing a nano-ordered carbon product, comprises: exposing a liquid refinery hydrocarbon product to a first functionalization agent to produce a first solid functionalized product comprising sulfur during a first functionalization process, wherein the first functionalization agent comprises elemental sulfur ($S_8$), carbon disulfide, a thiol, an organic sulfide, a metal sulfide, or any combination thereof. The method can purify, the first solid functionalized product during a purification process. The method can also expose the first solid functionalized product to a second functionalization agent to produce a second solid functionalized product during a second functionalization process, wherein the second functionalization agent comprises oxygen gas ($O_2$), air, or oxygen-enriched air, and wherein the second solid functionalized product comprises sulfur and oxygen. In addition, the method can carbonize the second solid functionalized product to produce a hard carbon product during a carbonization process.

FIG. 1 is a flowchart illustrating a method 100 containing operations 110-140 for preparing solid nano-ordered carbon products, according to one or more embodiments described and discussed herein. At operation 110, a liquid refinery hydrocarbon product is exposed to or otherwise combined with one or more first functionalization agents, such as a sulfurization agent, to produce the first solid functionalized product containing sulfur during a first functionalization process. At operation 120, the first solid functionalized product is purified during a purification process. At operation 130, the first solid functionalized product is exposed to or otherwise combined with one or more second functionalization agents, such as an oxidizing agent, to produce a second solid functionalized product containing sulfur and oxygen during a second functionalization process. At operation 140, the second solid functionalized product is heated and carbonized to produce one or more nano-ordered carbon (NOC) products, such as a hard carbon product, during a carbonization process.

In one or more embodiments, prior to the first functionalization process at operation 110, an initial refinery hydrocarbon product can be exposed to or otherwise treated to one or more pretreatments, such as a fractionation process, a distillation process, a heat soaking process, or a dilution process to produce the liquid refinery hydrocarbon product. In one or more examples, the initial refinery hydrocarbon product is exposed to a fractionation process to remove or otherwise separate a light hydrocarbon cut and produce a heavy cut which is the liquid refinery hydrocarbon product. The light hydrocarbon cut has a boiling point from a minimum value of about 50° C., about 100° C., or about 150° C. to a maximum value of about 180° C., about 200° C., about 240° C., about 260° C., about 300° C., about 325° C., about 350° C., or 370° C. For example, the light hydrocarbon cut has a boiling point of about 50° C. to 370° C., about 50° C. to about 350° C., about 50° C. to about 300° C., about 50° C. to about 260° C., about 50° C. to about 200° C., about 50° C. to about 150° C., about 50° C. to about 100° C., about 150° C. to 370° C., about 150° C. to about 350° C., about 150° C. to about 300° C., about 150° C. to about 260° C., about 150° C. to about 200° C., about 220° C. to 370° C., about 220° C. to about 350° C., about 220° C. to about 300° C., about 220° C. to about 260° C., or about 220° C. to about 240° C.

In some examples, the heavy cut or the liquid refinery hydrocarbon product has a boiling point of about or greater than 260° C. In other examples, the heavy cut or the liquid refinery hydrocarbon product has a boiling point of about or greater than 370° C. In one or more embodiments, the heavy cut or the liquid refinery hydrocarbon product has a boiling point from a minimum value of greater than 260° C., about 270° C., about 300° C., about 350° C., greater than 370° C., about 375° C., about 400° C., or about 425° C. to a maximum value of about 450° C., about 500° C., about 550° C., about 600° C., or greater. For example, the heavy cut or the liquid refinery hydrocarbon product has a boiling point of greater than 260° C. to about 600° C., greater than 260° C. to about 550° C., greater than 260° C. to about 500° C., greater than 260° C. to about 450° C., greater than 260° C. to about 400° C., about 300° C. to about 600° C., about 300° C. to about 550° C., about 300° C. to about 500° C., about 300° C. to about 450° C., about 300° C. to about 400° C., greater than 370° C. to about 600° C., greater than 370° C. to about 550° C., greater than 370° C. to about 500° C., greater than 370° C. to about 450° C., greater than 370° C.

to about 400° C., about 380° C. to about 600° C., about 380° C. to about 550° C., about 380° C. to about 500° C., about 380° C. to about 450° C., or about 380° C. to about 400° C.

In other embodiments, the initial refinery hydrocarbon product is heated to a temperature of about 200° C. to about 600° C. for about 1 hour to about 24 hours during the heat soaking process. In other examples, the initial refinery hydrocarbon product is heated to a temperature of about 300° C. to about 450° C. for about 2 hours to about 12 hours during the heat soaking process. The initial refinery hydrocarbon product can be maintained under a vacuum or an inert atmosphere containing nitrogen ($N_2$), argon, helium, or combinations thereof during the heat soaking process. In some examples, the heat soak is able to produce the liquid refinery hydrocarbon product with an average molecular weight greater than 400 and an average number of aromatic rings greater than 10. In another embodiment, the liquid refinery hydrocarbon product has an average molecular weight greater than 500.

In other embodiments, the initial refinery hydrocarbon product can be pretreated by filtration and/or adding chemical agent to remove catalyst fine particles that are entrained during FCC operation in order to produce the liquid refinery hydrocarbon product. The initial refinery hydrocarbon product can be further hydrotreated to remove sulfur and/or nitrogen while producing the liquid refinery hydrocarbon product.

At operation 110, the liquid refinery hydrocarbon product is exposed to or otherwise combined with one or more first functionalization agents containing sulfur during the first functionalization process to produce the first solid functionalized product containing sulfur. For example, the liquid refinery hydrocarbon product is exposed to or otherwise combined with one or more sulfurization agents during the first functionalization process to produce the first solid functionalized product containing sulfur.

The liquid refinery hydrocarbon product can be or include any type of hydrocarbon which can be functionalized (e.g., sulfurized and oxidized) to form the functionalized solid product. The liquid refinery hydrocarbon product can be selected from the liquid components that are produced from a fluid catalytic cracking (FCC) unit, a coking reactor, ethylene cracking, coal coking, or even a distillation tower. The liquid refinery hydrocarbon product can be or include one or more FCC slurry oils, one or more heavy hydrocarbon streams containing polyaromatic hydrocarbons, one or more coker gas oils from a coking process, one or more vacuum or distillation gas oils from vacuum distillation, one or more ethylene tars, one or more cracking fluids, one or more coal tars, or any combination thereof. Typically, an FCC unit is used to convert high-boiling point, high molecular weight hydrocarbons into other products, such as FCC slurry oils. In one or more examples, the liquid refinery hydrocarbon product containing an FCC slurry oil has a boiling point of about 260° C. (500° F.) to about 704° C. (1,300° F.), an average molecular weight of about 100 to about 400, and an average number of aromatic rings of 2 to about 10. In some examples, the liquid refinery hydrocarbon product contains about 20 wt % to about 99 wt % of aromatic or polyaromatic molecules. In one or more examples, about 20% to about 80% of the carbon atoms in the liquid refinery hydrocarbon product belong to aromatic carbon family, as detected by nuclear magnetic resonance (NMR) spectroscopy. The FCC slurry oil is generally defined as lower viscosity, catalytic-cracked clarified oil that generally has a viscosity of about 48 cST to about 200 cST @ 122° F. In other examples, the liquid refinery hydrocarbon product containing an FCC slurry oil has an average molecular weight of greater than 400 to about 600 and an average number of aromatic rings greater than 10 to about 20. The use of the liquid refinery hydrocarbon products allows for solid nano-ordered carbon products to be produced on a mass scale, from a centralized and extremely low-cost feedstock.

In one or more embodiments, the first functionalization process can be or include a sulfurization process. The first functionalization agent includes or is one or more sulfurization agents. The first functionalization agent and/or the sulfurization agent can be or include sulfur and/or one or more sulfur-containing compounds which can be used to sulfurize the liquid refinery hydrocarbon product. It is theorized that the cross-linking by the sulfur groups will increase the softening point of the liquid refinery hydrocarbon product to at least 100° C., 120° C., 150° C., even greater than 300° C. The first functionalization agent and/or the more sulfurization agent can be or include elemental sulfur ($S_8$), carbon disulfide, one or more thiols, one or more organic sulfides, one or more metal sulfides, or any combination thereof. Exemplary organic sulfides can be or include benzodithiol, dithiazole, derivatives thereof, complexes thereof, or combinations thereof. As a result of this initial functionalization with sulfur, the first solid functionalized product can have an average molecular weight increase from to about 400 to about 1,500.

In one or more examples, a reaction mixture containing the liquid refinery hydrocarbon product and the first functionalization agent is heated to a process temperature for about 10 minutes to about 24 hours during the first functionalization process. The reaction mixture can be heated and maintained at the process temperature from a minimum value of about 50° C., about 100° C., about 150° C., about 180° C., or about 200° C. to a maximum value of about 220° C., about 250° C., about 300° C., about 350° C., about 400° C., about 500° C., or greater during the first functionalization process or the sulfurization process. For example, the process temperature can be about 50° C. to about 400° C., about 100° C. to about 400° C., about 100° C. to about 400° C., about 100° C. to about 500° C., about 100° C. to about 400° C., about 100° C. to about 350° C., about 100° C. to about 300° C., about 100° C. to about 250° C., about 100° C. to about 200° C., about 100° C. to about 150° C., about 200° C. to about 400° C., about 200° C. to about 400° C., about 200° C. to about 500° C., about 200° C. to about 400° C., about 200° C. to about 350° C., about 200° C. to about 300° C., about 200° C. to about 250° C., about 200° C. to about 225° C., about 250° C. to about 400° C., about 250° C. to about 400° C., about 250° C. to about 500° C., about 250° C. to about 400° C., about 250° C. to about 350° C., or about 250° C. to about 300° C. during the first functionalization process or the sulfurization process.

The reaction mixture containing the liquid refinery hydrocarbon product and the first functionalization agent is heated and/or maintained at the process temperature for a time period from a minimum value of about 0.5 hours, about 1 hour, about 1.5 hours, about 2 hours, or about 2.5 hours to a maximum value of about 3 hours, about 4 hours, about 5 hours, about 6 hours, about 8 hours, about 10 hours, about 12 hours, about 15 hours, about 18 hours, about 20 hours, about 24 hours, or longer during the first functionalization process.

In one or more examples, the liquid refinery hydrocarbon product and elemental sulfur are combined to produce a reaction mixture which is heated at a temperature of about 200° C. to about 300° C. for about 10 minutes to about 60 minutes or about 15 minutes to about 30 minutes.

The first solid functionalized product has relatively high a sulfur concentration. The first solid functionalized product has a concentration of sulfur from a minimum value of about 10 wt %, about 12 wt %, about 15 wt %, about 16 wt %, about 18 wt %, about 20 wt %, about 22 wt %, about 24 wt %, or about 25 wt % to a maximum value of about 26 wt %, about 28 wt %, about 30 wt %, about 32 wt %, about 35 wt %, about 38 wt %, about 40 wt %, about 42 wt %, about 45 wt %, about 50 wt %, or greater. For example, the first solid functionalized product contains about 10 wt % to about 50 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 22 wt %, about 15 wt % to about 20 wt %, about 15 wt % to about 18 wt %, about 18 wt % to about 50 wt %, about 18 wt % to about 45 wt %, about 18 wt % to about 40 wt %, about 18 wt % to about 35 wt %, about 18 wt % to about 30 wt %, about 18 wt % to about 25 wt %, about 18 wt % to about 22 wt %, about 18 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, or about 20 wt % to about 22 wt % of sulfur.

In one or more embodiments, the first solid functionalized product containing sulfur can be ground, milled, or otherwise reduced into micro-sized particles prior to going through the purification process. Micro-sized particles can generally have a particle size of about 1 µm to about 1,000 µm, about 10 µm to about 500 µm, about 100 µm to about 400 µm, or less than 250 µm. In one or more examples, the first solid functionalized product is ground into micro-sized particles having an average particle size of less than 250 µm prior to the purification process and/or the second functionalization process. In other examples, the first solid functionalized product containing sulfur is ground into micro-sized particles after the purification process and before the second functionalization process.

At operation 120, the first solid functionalized product is purified and/or filtered during the purification process. One of the benefits of restricting the initial functionalization to a maximum functional group weight percentage within the first solid functionalized product is that it allows for an opportunity to purify the first solid functionalized product of contaminants prior to a secondary functionalization of the first solid functionalized product. Exemplary contaminants can be or include unreacted components such as one or more aromatic or polyaromatic compounds with one or more long side chains, a paraffinic compound, or a combination thereof. Contaminants can also be or include unreacted compounds of the first functionalization agent or sulfurization agent, as well as by-products including sulfur-containing by-products of the reaction mixture. It is theorized that removal of these contaminants has an adverse effect on the end product of the solid nano-ordered carbon.

In one or more examples, the first solid functionalized product is exposed to a solvent extraction during the purification process. The solvent can be or include any solvent or combination of solvents which the first solid functionalized product is relatively insoluble in so that the contaminants can be later readily removed or otherwise separated from the first solid functionalized product. The solvent can be or include one or more alkanes, xylene, toluene, benzene, pyridine, mesitylene, benzyl alcohol, benzonitrile, nitrobenzene, or any combination thereof. Exemplary alkanes can be or include butane, pentane, hexane, heptane, octane, nonane, decane, undecane, dodecane, isomers thereof, or any combination thereof.

In some examples, the first solid functionalized product is purified by solvent extraction with a non-polar solvent such as heptane to remove contaminants. In this example since the first solid functionalized product is purified by a non-polar solvent, adequate time and/or process can be allocated to ensure that the first solid functionalized product is dried prior to secondary functionalization.

At operation 130, the first solid functionalized product is exposed to or otherwise combined with one or more second functionalization agents containing oxygen to produce a second solid functionalized product containing sulfur and oxygen during a second functionalization process. In one or more embodiments, the second functionalization process can be or include an oxidation process. The second functionalization agent can be or include oxygen gas ($O_2$), air, or oxygen-enriched air, hydrogen peroxide, sulfuric acid, nitric acid, and combinations thereof. In one or more examples, the first functionalization agent can be or include elemental sulfur and the second functionalization agent can be or include oxygen gas, air, or oxygen-enriched air.

In one or more examples, the first solid functionalized product is oxidized with oxygen gas, air, or oxygen-enriched air during the second functionalization process to produce the second solid functionalized product. In some examples, the first solid functionalized product can be catalyzed heat soaked with addition of small amount of oxidizing agents such as sulfuric acid, nitric acid, or hydrogen peroxide. In other examples, the second functionalization agent can be or include one or more oxygen-containing organic compounds which is combined with the first solid functionalized product during an organic compound oxidation process. Exemplary oxygen-containing organic compounds can be or includes one or more organic peroxides, one or more organic acids, one or more anhydrides, one or more esters, one or more ketones, one or more aldehydes, or any combination thereof.

In one embodiment, the secondary functionalization can occur through air oxidation during the second functionalization process. For example, the secondary functionalization of the first solid functionalized product can be deeply oxidized with air in powder drying equipment. The oxidation temperature can range from about 200° C. to about 400° C. or about 250° C. to about 350° C.

In some examples, this secondary functionalization can increase the oxygen content of the intermediate product from about 15 wt % to about 30 wt %. The second solid functionalized product promotes cross-linking which prevents the growth or long-range ordered carbon structure during carbonization and subsequently helps in the formation of the solid nano-ordered carbon product.

The reaction mixture containing the first solid functionalized product and the second functionalization agent is heated to a process temperature during the second functionalization process. The process temperature can be from a minimum value of about 50° C., about 100° C., about 150° C., about 200° C., about 250° C., or about 300° C. to a maximum value of about 350° C., about 400° C., about 500° C., about 600° C., about 700° C., about 800° C., about 900° C., about 950° C., about 990° C., or less than 1,000° C. during the second functionalization process. For example, the process temperature can be about 50° C. to less than 1,000° C., about 100° C. to less than 1,000° C., about 200° C. to less than 1,000° C., about 350° C. to less than 1,000° C., about 500° C. to less than 1,000° C., about 750° C. to less than 1,000° C., about 900° C. to less than 1,000° C., about 50° C. to about 900° C., about 100° C. to about 900° C., about 200° C. to about 900° C., about 350° C. to about 900° C., about 500° C. to about 900° C., about 750° C. to about 900° C., about 50° C. to about 700° C., about 100° C. to about 700° C., about 200° C. to about 700° C., about 350° C. to about 700° C., about 500° C. to about 700° C., about 600° C. to about 700° C., about 50° C. to about 500° C., about 100° C. to about 500° C., about 200° C. to about 500° C., about 250° C. to about 500° C., about 300° C. to about 500° C., or about 350° C. to about 500° C. during the second functionalization process.

In one or more examples, a reaction mixture containing the first solid functionalized product and the second functionalization agent is heated to a process temperature of about 200° C. to about 400° C. or about 250° C. to about 350° C. during the second functionalization process. In some examples, the secondary functionalizing occurs via air oxidation at a temperature of about 200° C. to about 375° C. during the second functionalization process. In other examples, the air oxidation can occur at a temperature of about 325° C. to about 375° C., such as from about 340° C. to about 360° C. during the second functionalization process.

The reaction mixture containing the first solid functionalized product and the second functionalization agent is heated and/or maintained at the process temperature for a time period from a minimum value of about 0.5 hours, about 1 hour, about 1.5 hours, about 2 hours, or about 2.5 hours to a maximum value of about 3 hours, about 4 hours, about 5 hours, about 6 hours, about 8 hours, about 10 hours, about 12 hours, about 15 hours, about 18 hours, about 20 hours, about 24 hours, or longer during the second functionalization process.

The second solid functionalized product contains both sulfur and oxygen. The second solid functionalized product can have a sulfur concentration from a minimum value of about 5 wt %, about 6 wt %, about 8 wt %, about 10 wt %, about 12 wt %, about 14 wt %, or about 15 wt % to a maximum value of about 16 wt %, about 18 wt %, about 20 wt %, about 22 wt %, about 25 wt %, about 28 wt %, about 30 wt %, about 32 wt %, about 35 wt %, or greater. For example, the second solid functionalized product contains about 5 wt % to about 35 wt %, about 5 wt % to about 30 wt %, about 5 wt % to about 25 wt %, about 5 wt % to about 22 wt %, about 5 wt % to about 20 wt %, about 5 wt % to about 18 wt %, about 5 wt % to about 15 wt %, about 5 wt % to about 12 wt %, about 5 wt % to about 10 wt %, about 5 wt % to about 8 wt %, about 10 wt % to about 35 wt %, about 10 wt % to about 30 wt %, about 10 wt % to about 25 wt %, about 10 wt % to about 22 wt %, about 10 wt % to about 20 wt %, about 10 wt % to about 18 wt %, about 10 wt % to about 15 wt %, about 10 wt % to about 12 wt %, about 15 wt % to about 35 wt %, about 15 wt % to about 30 wt %, about 15 wt % to about 25 wt %, about 15 wt % to about 22 wt %, about 15 wt % to about 20 wt %, or about 15 wt % to about 18 wt % of sulfur.

The second solid functionalized product can have an oxygen concentration from a minimum value of about 5 wt %, about 6 wt %, about 8 wt %, about 10 wt %, about 12 wt %, about 14 wt %, or about 15 wt % to a maximum value of about 16 wt %, about 18 wt %, about 20 wt %, about 22 wt %, about 25 wt %, about 28 wt %, about 30 wt %, about 32 wt %, about 35 wt %, or greater. For example, the second solid functionalized product contains about 5 wt % to about 35 wt %, about 5 wt % to about 30 wt %, about 5 wt % to about 25 wt %, about 5 wt % to about 22 wt %, about 5 wt % to about 20 wt %, about 5 wt % to about 18 wt %, about 5 wt % to about 15 wt %, about 5 wt % to about 12 wt %, about 5 wt % to about 10 wt %, about 5 wt % to about 8 wt %, about 10 wt % to about 35 wt %, about 10 wt % to about 30 wt %, about 10 wt % to about 25 wt %, about 10 wt % to about 22 wt %, about 10 wt % to about 20 wt %, about 10 wt % to about 18 wt %, about 10 wt % to about 15 wt %, about 10 wt % to about 12 wt %, about 15 wt % to about 35 wt %, about 15 wt % to about 30 wt %, about 15 wt % to about 25 wt %, about 15 wt % to about 22 wt %, about 15 wt % to about 20 wt %, or about 15 wt % to about 18 wt % of oxygen.

In one or more examples, the second solid functionalized product contains about 5 wt % to about 35 wt % of sulfur and about 5 wt % to about 35 wt % of oxygen. In other examples, the second solid functionalized product contains about 10 wt % to about 25 wt % of sulfur and about 5 wt % to about 30 wt % of oxygen.

At operation 140, the second solid functionalized product is further processed to produce one or more solid nano-ordered (NOC) carbon products including hard carbon products during the carbonization process. For example, the second solid functionalized product can be heated and carbonized to produce the solid nano-ordered carbon product during the carbonization process. The second solid functionalized product can be heated and maintained under an atmosphere of a relatively inert gas (e.g., dinitrogen, argon, helium, or mixtures thereof) or can be maintained under a vacuum while producing the solid nano-ordered carbon product during the carbonization process. The solid nano-ordered carbon products can be or include hard carbon, as well as other types of carbon materials, such as soft carbon, glassy carbon, or porous carbon, or combination of these materials.

The carbonization process can be performed in a furnace (e.g., graphitization furnace or carbonization furnace), a thermal chamber, a reactor, or another type of vessel or container. In one or more embodiments, the second solid functionalized product is heated to a temperature of about 800° C. or greater for about 1 hour to about 5 hours during the carbonization process to produce the solid nano-ordered carbon product (e.g., the hard carbon product) used as the anode carbon material. The second solid functionalized product is heated to a temperature from a minimum value of about 800° C., about 900° C., about 1,000° C., about 1,200° C., or about 1,400° C. to a maximum value of about 1,500° C., about 1,650° C., about 1,800° C., about 2,000° C., about 2,300° C., about 2,500° C., about 2,700° C., about 2,900° C., about 3,000° C., or greater during the carbonization process. For example, the second solid functionalized product is heated to a temperature of about 800° C. to about 3,000° C., about 800° C. to about 2,500° C., about 800° C. to about 2,000° C., about 800° C. to about 1,800° C., about 800° C. to about 1,500° C., about 800° C. to about 1,000° C., about 1,000° C. to about 3,000° C., about 1,000° C. to about 2,900° C., about 1,000° C. to about 2,500° C., about 1,000° C. to about 2,200° C., about 1,000° C. to about 2,000° C., about 1,000° C. to about 1,800° C., about 1,000° C. to about 1,500° C., about 1,000° C. to about 1,200° C., about 1,400° C. to about 3,000° C., about 1,400° C. to about 2,500° C., about 1,400° C. to about 2,000° C., or about 1,400° C. to about 1,800° C. during the carbonization process.

The carbonization process removes much of the sulfur and oxygen from the second solid functionalized product. As such, the concentrations of the sulfur and the oxygen is greatly reduced in solid nano-ordered carbon product, such as the hard carbon product, relative to the second solid functionalized product. The solid nano-ordered carbon product, including the hard carbon product, has a sulfur concentration of less than 3 wt %, such as about 0.01 wt % to about 2.5 wt %, about 0.01 wt % to about 2 wt %, or about 0.01 wt % to about 1.5 wt %. The solid nano-ordered carbon product, including the hard carbon product, has an oxygen concentration of less than 2 wt %, such as about 0.01 wt % to about 1.5 wt %, about 0.01 wt % to about 1.2 wt %, or about 0.01 wt % to about 1 wt %.

In one or more examples, the carbonization process includes heating the second solid functionalized product at a temperature of about 1,000° C. to about 3,000° C. for about 0.5 hours to about 10 hours to produce the hard carbon product. In other examples, the carbonization process includes heating the second solid functionalized product at a temperature of about 1,200° C. to about 2,500° C. for about 1 hour to about 5 hours to produce the hard carbon product. In some examples, the carbonization process includes heating the second solid functionalized product at a temperature of about 1,500° C. to about 2,000° C. for about 2 hours to about 4 hours to produce the hard carbon product.

The carbonization process can produce the solid nano-ordered carbon product, such as the hard carbon product, with interspacing of about 3.4 Å or greater. For example, the solid nano-ordered carbon product can have an interspacing of about 3.4 Å, about 3.5 Å, about 3.6 Å, about 3.7 Å, about 3.8 Å, about 3.9 Å, or greater. In some examples, the solid nano-ordered carbon product can have an interspacing of about 3.4 Å to about 3.9 Å, about 3.5 Å to about 3.9 Å, about 3.6 Å to about 3.9 Å, about 3.7 Å to about 3.9 Å, about 3.8 Å to about 3.9 Å, about 3.4 Å to about 3.7 Å, about 3.5 Å to about 3.7 Å, or about 3.6 Å to about 3.7 Å.

In other embodiments, the carbonization process can also produce a solid nano-ordered carbon product with nanopores encased by curved or entangled graphene sheets. The carbonization process can be conducted in a one-step or a multi-step process such as a two-step process. In a one-step process the carbonization occurs immediately at the desire temperature range. In a multi-step process the intermediate products can be pre-carbonized at a temperature, such as less than 1,200° C. in a two-step process, to remove volatiles. The next step in the multi-step process can be to anneal the pre-carbonized intermediate product at a greater temperature to finalize forming the solid nano-ordered carbon product.

The solid nano-ordered carbon products can be prepared from the liquid refinery hydrocarbon product at a product weight yield of about 50%, about 55%, about 60%, about 65%, about 70%, about 75%, about 80%, about 85%, about 90%, or greater during the method 100. For example, the solid nano-ordered carbon products can be prepared from the liquid refinery hydrocarbon product at a product weight yield of about 50% to about 90%, about 60% to about 90%, about 70% to about 90%, about 80% to about 90%, about 50% to about 75%, about 60% to about 75%, or about 70% to about 75% during the method 100.

The method 100 for preparing the solid nano-ordered carbon (e.g., the hard carbon products) can include and/or omit different operations 110-140 and/or processes as described and discussed herein. The method 100 can also include other processes before, after, in between, or during any of the operations 110-140. In one or more examples, the method 100 includes exposing the liquid refinery hydrocarbon product to the first functionalization agent to produce the first solid functionalized product during the first functionalization process (operation 110). Each of the first functionalization agent and the first solid functionalized product contains sulfur. The method 100 further includes purifying the first solid functionalized product during the purification process (operation 120) and exposing the first solid functionalized product to the second functionalization agent to produce the second solid functionalized product during the second functionalization process (operation 130). The second functionalization agent contains oxygen, and the second solid functionalized product contains sulfur and oxygen. The method 100 also includes carbonizing the second solid functionalized product to produce the hard carbon product during the carbonization process (operation 140).

In other examples, the method 100 includes heating the initial refinery hydrocarbon product to remove the light hydrocarbon cut from the liquid refinery hydrocarbon product during the fractionation process. The light hydrocarbon cut has the boiling point of about 50° C. to about 370° C. and the liquid refinery hydrocarbon product has the boing point of greater than 370° C. The method 100 also includes exposing the liquid refinery hydrocarbon product to the first functionalization agent to produce the first solid functionalized product during the first functionalization process (operation 110). Each of the first functionalization agent and the first solid functionalized product contains sulfur. The method 100 further includes purifying the first solid functionalized product by the solvent extraction during the purification process (operation 120) and exposing the first solid functionalized product to the second functionalization agent to produce the second solid functionalized product during the second functionalization process (operation 130). The second functionalization agent contains oxygen, and the second solid functionalized product contains sulfur and oxygen. The method 100 also includes carbonizing the second solid functionalized product to produce the hard carbon product during the carbonization process (operation 140).

In some examples, the method 100 includes exposing the liquid refinery hydrocarbon product to the first functionalization agent to produce the first solid functionalized product comprising sulfur during the first functionalization process (operation 110). The first functionalization agent contains elemental sulfur ($S_8$), carbon disulfide, one or more thiols, one or more organic sulfides, or any combination thereof. The method 100 further includes purifying the first solid functionalized product during the purification process (operation 120) and exposing the first solid functionalized product to the second functionalization agent to produce the second solid functionalized product during the second functionalization process (operation 130). The second functionalization agent contains oxygen gas ($O_2$), air, or oxygen-enriched air and the second solid functionalized product contains sulfur and oxygen. The method 100 also includes carbonizing the second solid functionalized product to produce the hard carbon product during the carbonization process (operation 140).

In one or more general examples, a hard carbon product can be made from an initial liquid petroleum which can be or include one or more heavy refinery streams. Exemplary heavy refinery streams can contain about 20 wt % to about 99 wt % of aromatic molecules (including mono-aromatics and polyaromatics) and/or about 20 wt % to about 80 wt % of aromatic carbon (as detailed by NMR spectroscopy). The average molecular weight of these streams range from about 100 to about 400. In some examples, the streams can be or include vacuum gas oil from vacuum distillation, slurry oil from FCC operation, coker gas oil from coking process, or any combination thereof.

The heavy steams are fractionated to remove undesired fractions such as light cuts that are less than 260° C. (500° F.) or less than 371° C. (700° F.). The undesired fractions are then either recycled back to the original refining unit such as FCC or sent to other refining units such as hydrotreating units to obtain gasoline or diesel fuels. The desired fractions have boiling point usually higher than 260° C. or greater than 371° C. The polyaromatic molecules in the desired fractions will be further concentrated.

The desired fractions are sent to sulfurization unit to process into an intermediate with higher average molecular weight and functional groups. The purpose of this step is to invest the intermediates with the properties that facilitate the subsequent processing and help produce structural restrictions to prevent graphite from forming at the calcination step. During sulfurization, elemental sulfur is mixed with the refinery stream in a constantly-stirred batch reactor. The reaction mixture is heated to temperatures of about 200° C. to about 300° C. within a short amount of time, such as less than 30 minutes, resulting in an intermediate product with about 10 wt % to about 50 wt % of sulfur.

The solid intermediate generated from sulfurization contains some unreacted species such as paraffinic components or other species with low reactivity. The unreacted species have adverse effect in forming porous structure during the subsequent steps. Extraction with solvents such as heptane is used to remove the unreacted species. After drying, the soluble species are sent to other refining units to process into fuel products. The solvent can be recycled. The insoluble products are transferred to next processing step.

The intermediate leaving solvent extraction is oxidized with air in a powder drying equipment at temperatures ranging from about 250° C. to about 350° C. The now both sulfurized and oxidized structures with cross-linked networks which help prevent the formation of graphite-like carbon structure during calcination and also restrict the crystallinity within short range.

The intermediate is calcined at a temperature of about 1,000° C. to about 2,900° C. to form the hard carbon products. Calcination could be conducted in one-step or two-step process. In a two-step process, the intermediate is calcined first at a lower temperature typically under 1,200° C. to remove volatile matters and then at a higher temperature to finalize the carbon structure of the hard carbon product.

Figure 2:
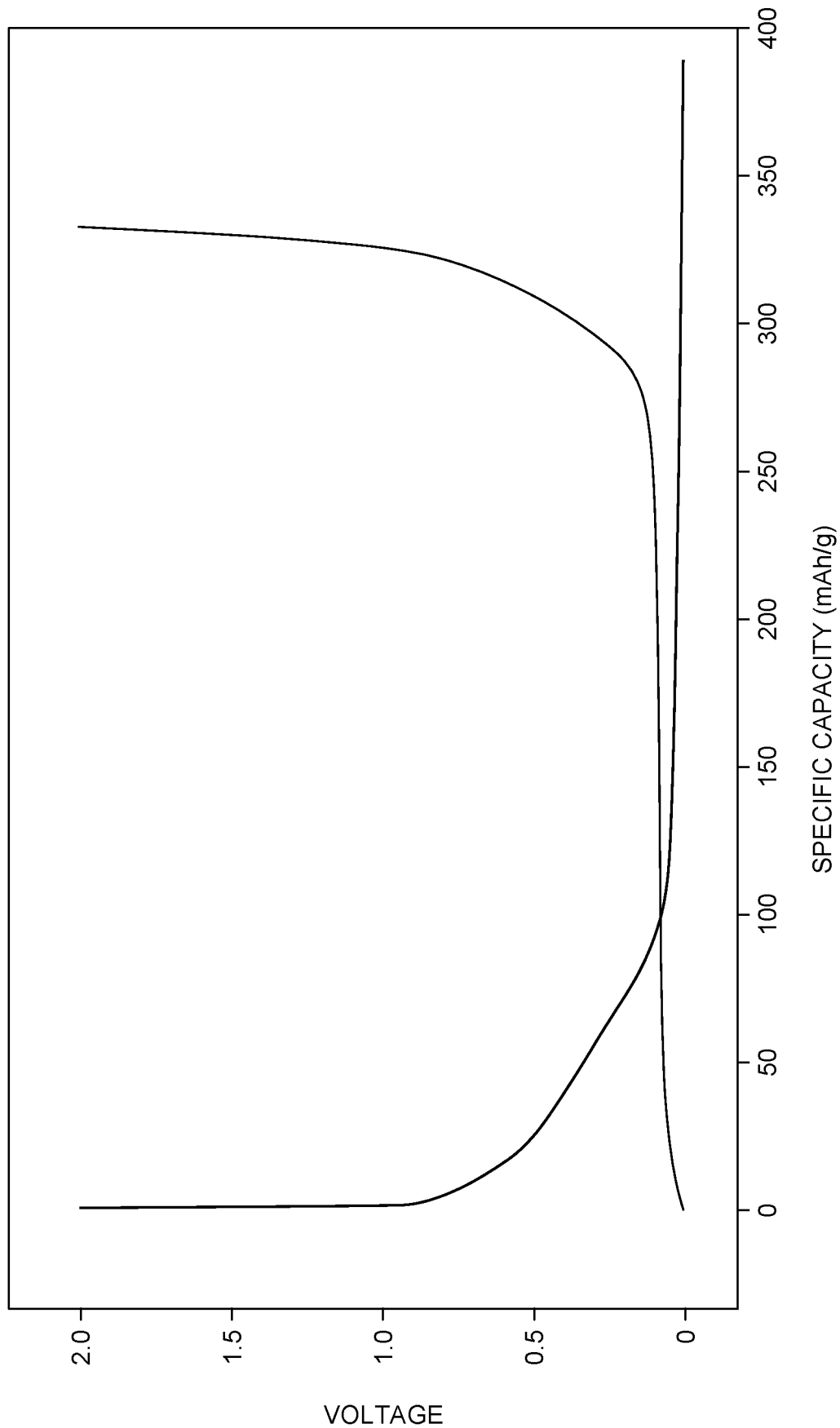
FIG. 2 is a graph showing discharge/charge profiles during the first cycle of battery half-cells containing solid nano-ordered carbon products prepared by methods described and discussed herein.

The hard carbon products or other solid nano-ordered carbon products can be used to reversibly store sodium ions in sodium batteries. The hard carbon product can produce 300+ mAh/g specific capacity with a first cycle efficiency of greater than 83% to about 86% during a first cycle test in a sodium ion batteries half-cell test. FIG. 2 is a graph showing discharge/charge profiles during the first cycle. The initial sodiation (discharge as shown by the thicker line) started at about 1 V to about 1.2 V, usually due to the interfacial interaction between electrolyte solution and carbon surface. The potential dropped as the sodium ion storage capacity increased until the profile came to a turning point where the potential started to change in a much slower pace while the capacity soared. Therefore, the total capacity for sodium ion storage consists of two fractions: capacity in the sloping section (>0.15 V) and capacity in the plateau region (<0.15 V). When charged back, the potential-capacity profile (shown as the thinner line) proceeded in a reversed order: plateau region followed by sloping region. The achieved desodiation capacity is less than sodiation capacity due to irreversible side reactions. The ratio of desodiation capacity to sodiation capacity is referred to as first cycle efficiency. In other embodiments, it has been shown that hard carbon product can be used to reversibly store lithium ions in lithium-ion batteries.

EXAMPLES

In order to provide a better understanding of the foregoing discussion, the following non-limiting examples are offered. Although the examples can be directed to specific embodiments, they are not to be viewed as limiting the scope of the invention in any specific respect.

Sulfurization of Slurry Oils

About 100 grams of heavy fraction (943F+) of slurry oil was heated to 100° C. and charged into a 300 mL Parr reactor vessel and 50 g of sulfur powder (99.98%, Sigma-Aldrich®) was then added to the same vessel. The mixture was manually mixed for 10 min before the vessel was installed and sealed. Sulfurization was carried out in nitrogen with controlled pressure between 50 psi and 100 psi during slow and controlled temperature ramping from room temperature to 200° C., after which the back pressure regulator was completely closed, and major reaction seemed to happen based on observed pressure hikes until heating was discontinued at 260° C.

Preparation of Hard Carbon

The sulfurized slurry material collected as small solid pieces was balled milled and sieved through 50 mesh to obtain a powder material. The powder material was dispersed in heptane heated on a hot plate set at 60° C. for 3 hours with continuous stirring, after which the solid in the suspension was filtered out and dried at 60° C. in vacuum overnight. The dried sample was heated in a muffle furnace for oxidation at the desired temperature for a certain duration. The oxidized sample was then calcined in a laboratory furnace under nitrogen atmosphere with a stepped temperature program (ramp to a desired temperature at 5° C./min and hold for 2 h). Finally, the calcined sample was ball milled and sieved through 500 mesh to obtain the hard carbon material as a fine powder.

Coin Cell Preparation and Test

To prepare the sample for coin cell tests, the material was first mixed with alginate binder and carbon black at 90:5:5 weight ratio, with some water added to reach the desired viscosity and consistency. The slurry mixture was then cast onto a carbon-coated aluminum substrate with a doctor blade to form a thin film, which was then dried in a vacuum oven at 80° C. for 1 h. Disks of 1.5 cm in diameter were punched out from the electrode films using a die cutter (MTI™ MSK-T-07). The sodium-ion coin cell was prepared in an argon-filled glovebox by sequentially stacking a Na metal as anode inside a bottom can, a separator (a layer of Whatman® GF-B glass fiber filter), an electrode disk as cathode, a stainless steel disk spacer, and a wave spring in a top can. 180 μL of electrolyte containing 1 M NaPF6 in ethylene carbonate and dimethyl carbonate (1:1 volume ratio, Sigma-Aldrich®) was added to the separator before the electrode disk was stacked. After the top can was placed over the bottom can, the assembly was crimped and sealed by a coin cell crimper (MTI™ MSK-110). Electrochemical tests were performed on a battery test station (Arbin® LBT21084). The electrical charge passed during each charge/discharge cycle was recorded and used to calculate the specific capacity and coulombic efficiency. The tests were conducted inside the argon-filled glovebox.

Sample Analysis

Samples for X-ray diffraction (XRD) analysis were packed loosely onto a silicon wafer low-background XRD sample holder and leveled to achieve a flat surface. XRD data was acquired on a Bruker D8 Advance diffractometer operated in θ-θ geometry with a copper X-ray source (Cu kα λ=1.54059 Å), divergent beam primary beam X-ray optics, and a Vantec1 position sensitive detector. Scans were acquired from 5° to 85° 2θ with a 0.03189° step size. Sulfur content was measured through combustion method on an instrument equipped with an infrared detector.

Results and Discussion

A two-stage plan was followed to establish a feasible process using sulfurized slurry oil precursors. First, a baseline process consisting of all (but no more than) necessary steps was to be identified; then optimization was to be carried out. In making hard carbon, the high temperature calcination step is necessary to eliminate any non-carbon element and form the necessary short-range graphite-like structure. Any steps prior to calcination are considered pretreatment. The first stage is to set up the pretreatment protocol. Three experiments were conducted respectively: without any pretreatment, with an oxidation step (300° C. for 3h), and with a heptane wash and then an oxidation step (300° C. for 3h). All three samples were subsequently subject to calcination at 1,400° C.

Figure 3:
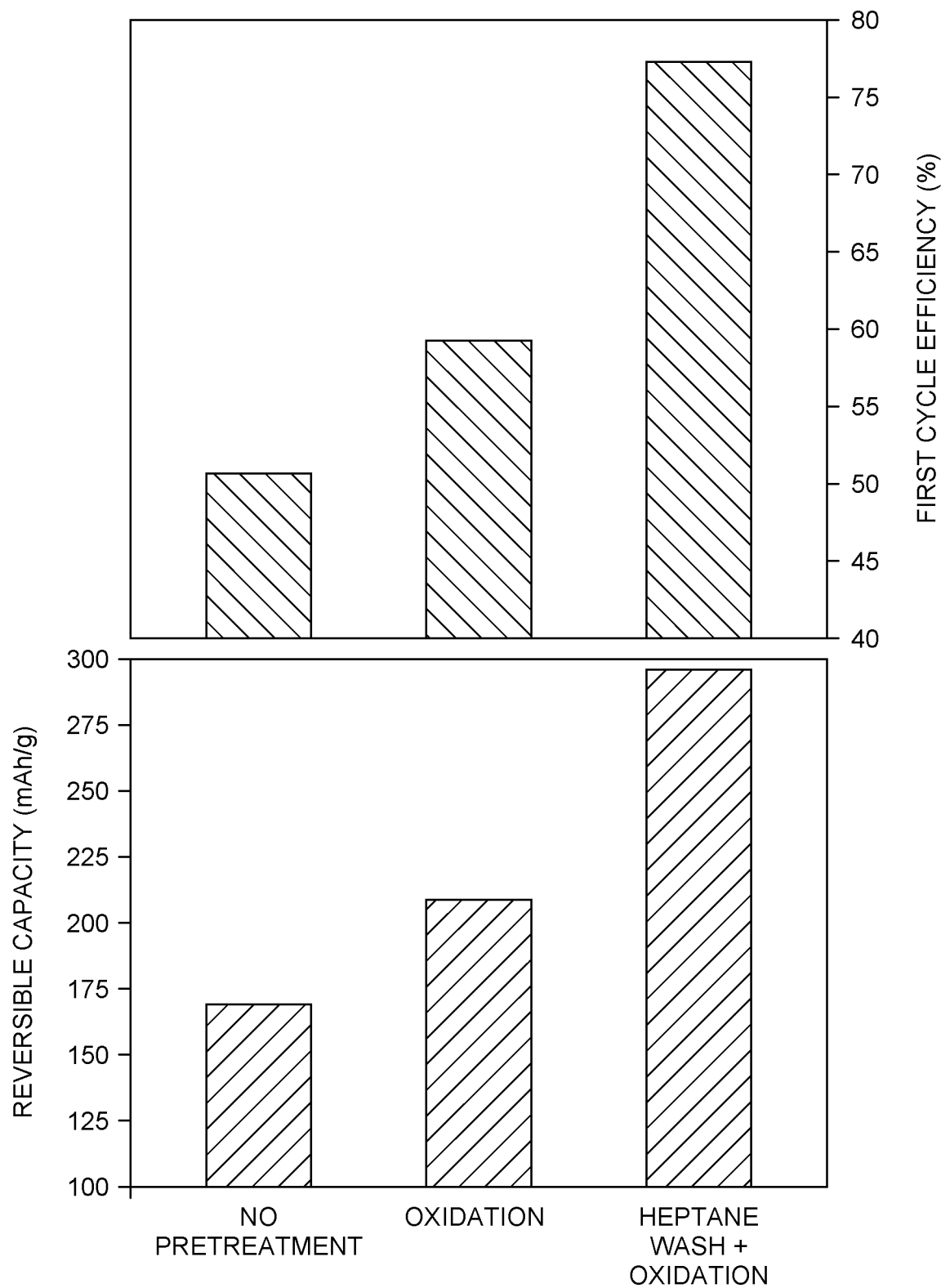
FIG. 3 is a graph showing representative key performance indicators (KPIs) from initial testing samples of pretreatment conditions to intermediate materials of various carbon products prepared by methods described and discussed herein.

FIG. 3 shows the key performance indicators (KPIs) in terms of reversible capacity and first cycle efficiency of the materials from the three processes. It is apparent that each step added to pretreatment leads to a step change in performance: without pretreatment, reversible capacity is 169 mAh/g, and first cycle efficiency is 51%; with oxidation, reversible capacity increases to 208 mAh/g and first cycle efficiency to 59%; heptane wash and oxidation together bump reversible capacity increases and first cycle efficiency to 295 mAh/g and 78%, respectively (Table 1).

TABLE 1

| Batch | Pretreatment | Reversible Capacity (mAh/g) | First Cycle Efficiency (%) | D spacing (Å) |
| --- | --- | --- | --- | --- |
| 1 | None | 168.9 | 50.7 | 3.51 |
| 2 | Oxidation | 208.0 | 59.2 | 3.51 |
| 3 | Heptane Wash + Oxidation | 295.4 | 77.5 | 3.69 |

Figure 4:
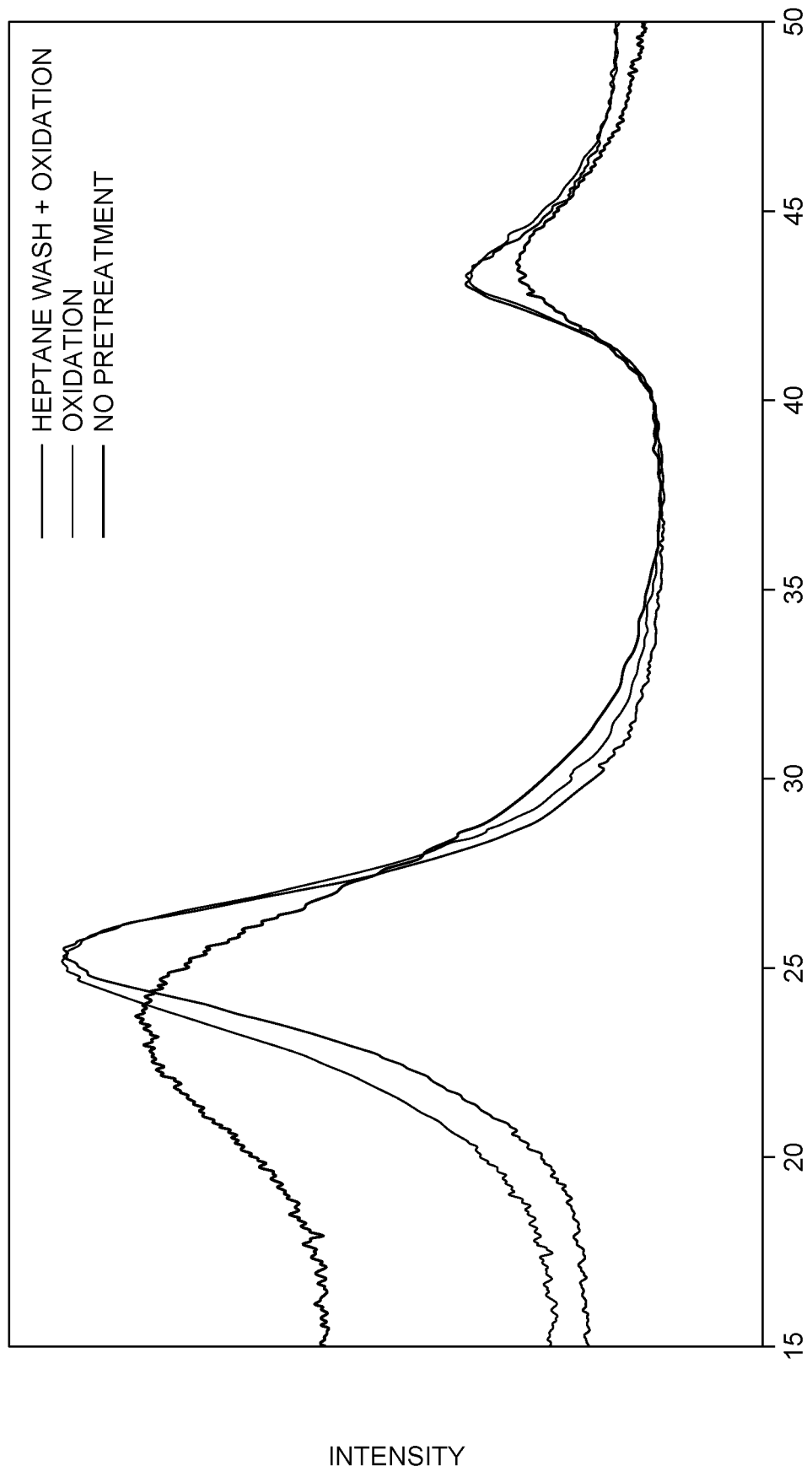
FIG. 4 is a graph showing XRD patterns of various carbon products prepared by methods described and discussed herein.

The X-ray diffraction (XRD) spectra (FIG. 4) of these samples indicate that the oxidation step increases the disorder by decreasing the thickness of the packets of short-range graphene layers, as signified by the widening of the (002) peak; with heptane wash prior to oxidation, the resulting material has both more disordered structures and much larger d-spacing, as seen from the much widened and more asymmetric shape of the (002) peak, and the shift of the peak from about 25.3° to about 24.1°. These are properties that favor insertion/intercalation of sodium ions. The benefits from heptane wash and oxidation are not unexpected: the former step can remove small and/or non-polar molecules that have more tendency to form ordered structures, while the latter step introduces oxygen to the precursor that helps to "lock" the molecules in place and reduce their degree of freedom, eventually also disrupting long-range order. The baseline pretreatment process included a heptane wash and an oxidation.

Figure 5:
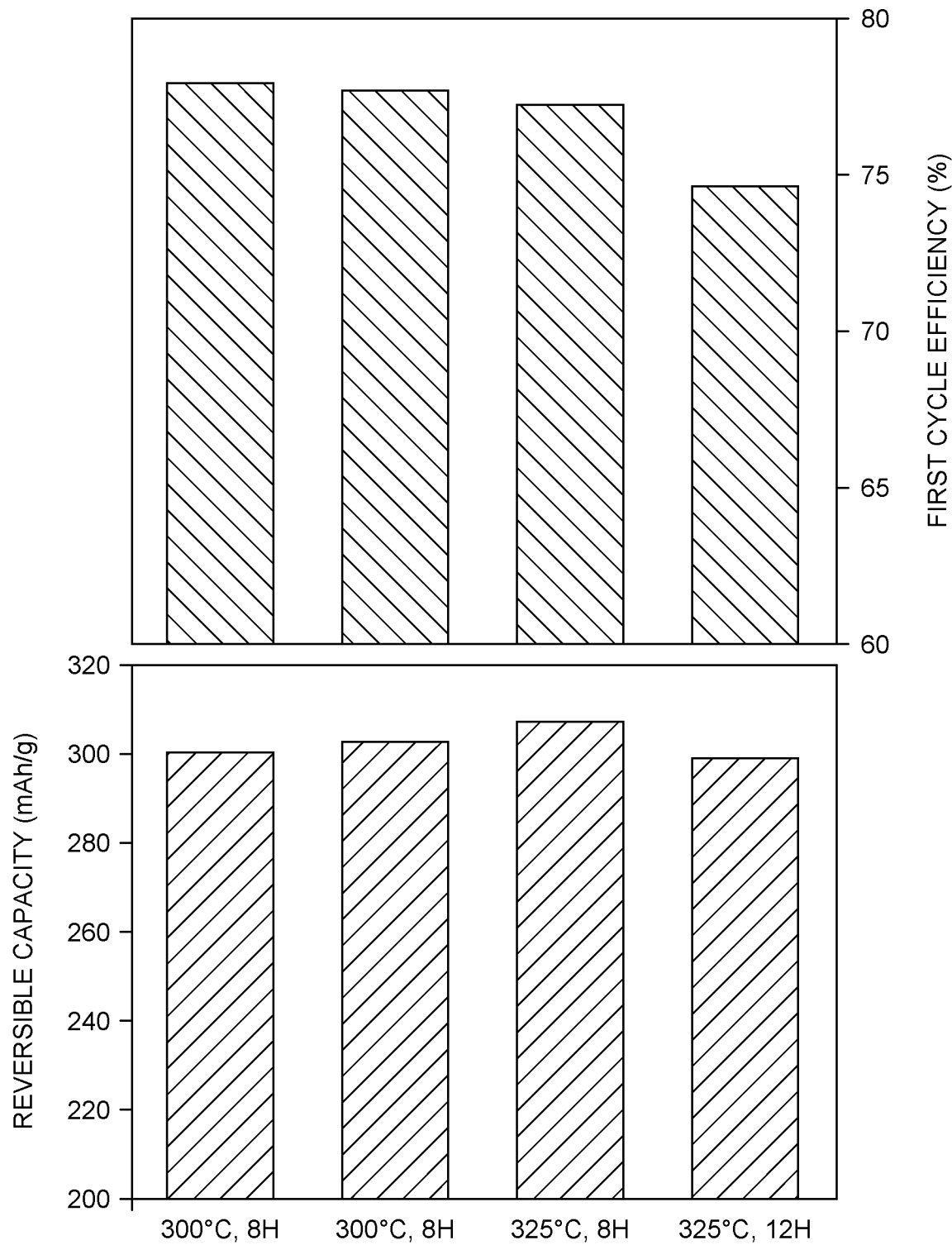
FIG. 5 is a graph showing KPIs from initial testing samples of oxidation treatments to intermediate materials of various carbon products prepared by methods described and discussed herein.
Figure 6:
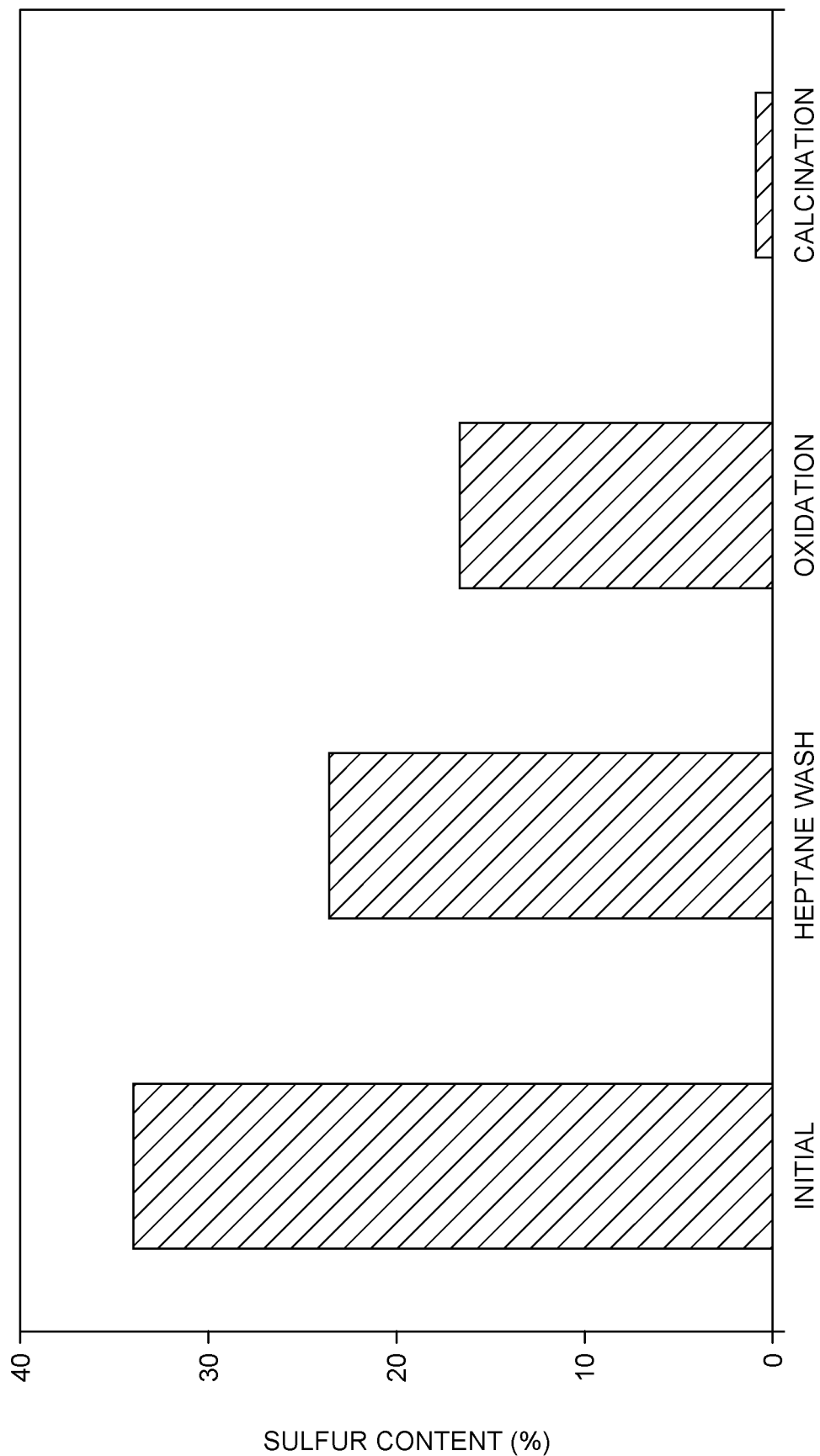
FIG. 6 is a graph showing sulfur content of intermediate materials and various carbon products prepared by methods described and discussed herein.
Figure 7:
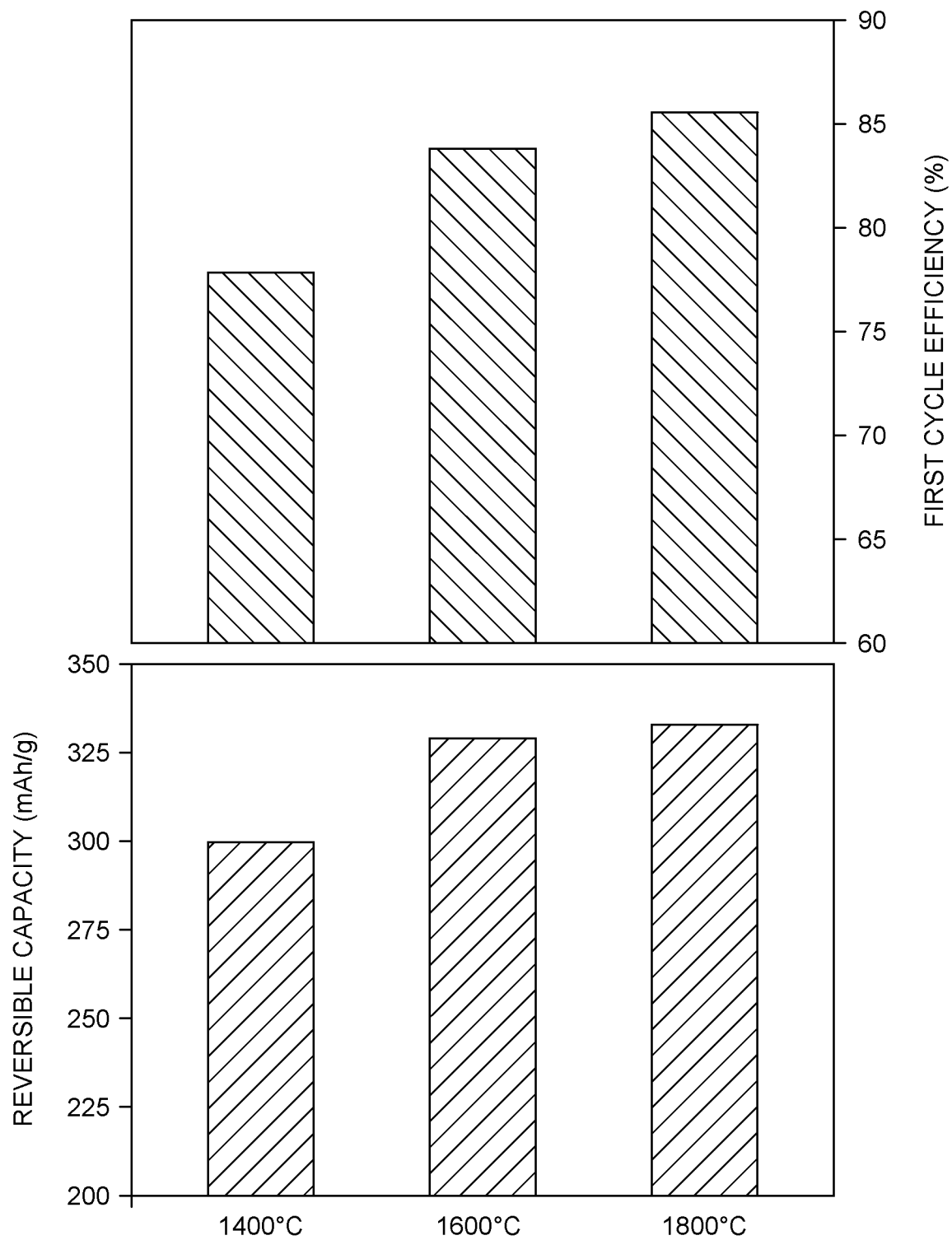
FIG. 7 is a graph showing KPIs from testing samples after being exposed to oxidation treatment and various temperatures during carbonization as prepared by methods described and discussed herein.
Figure 8:
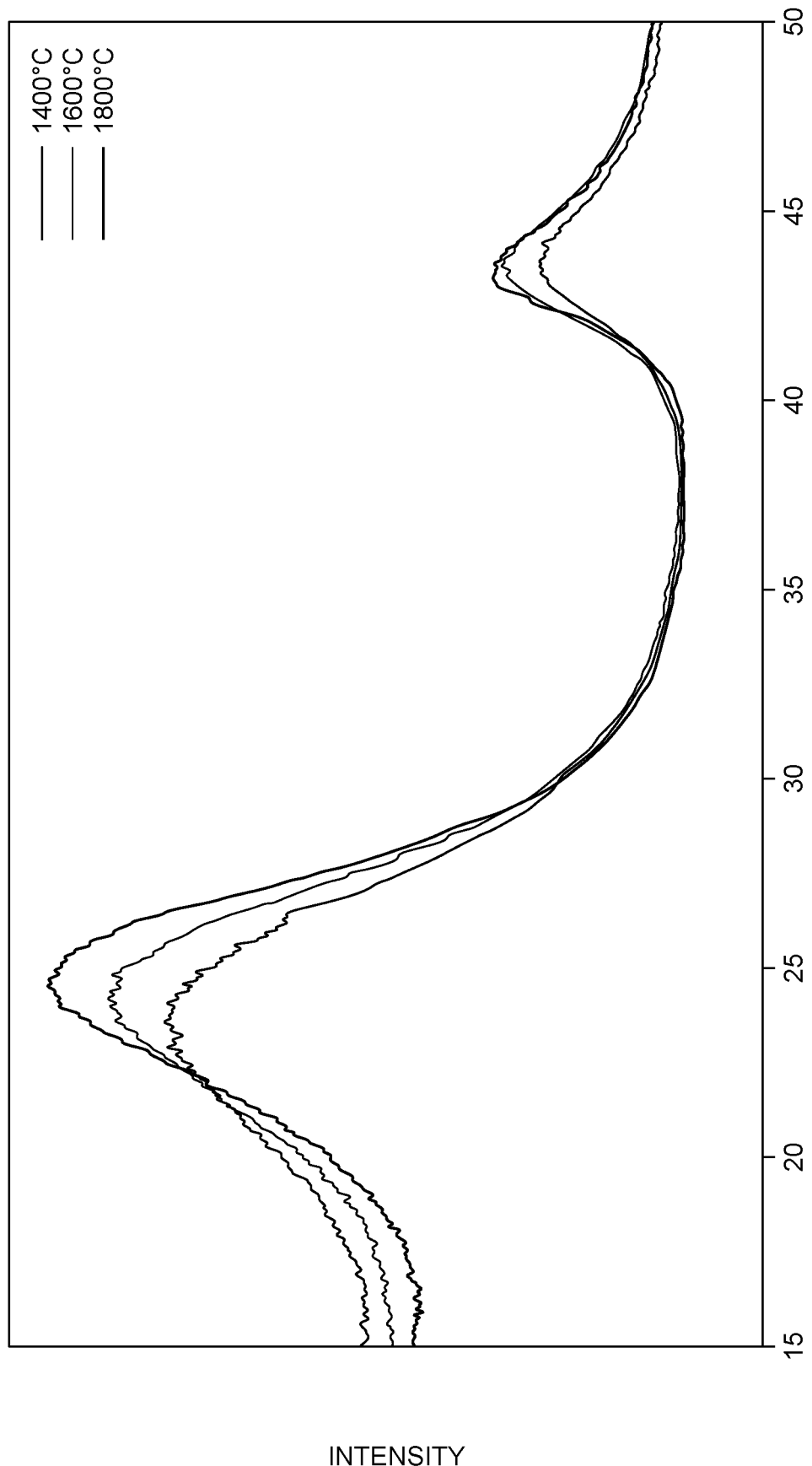
FIG. 8 is a graph showing XRD patterns of various carbon products prepared by methods described and discussed herein.
Figure 9:
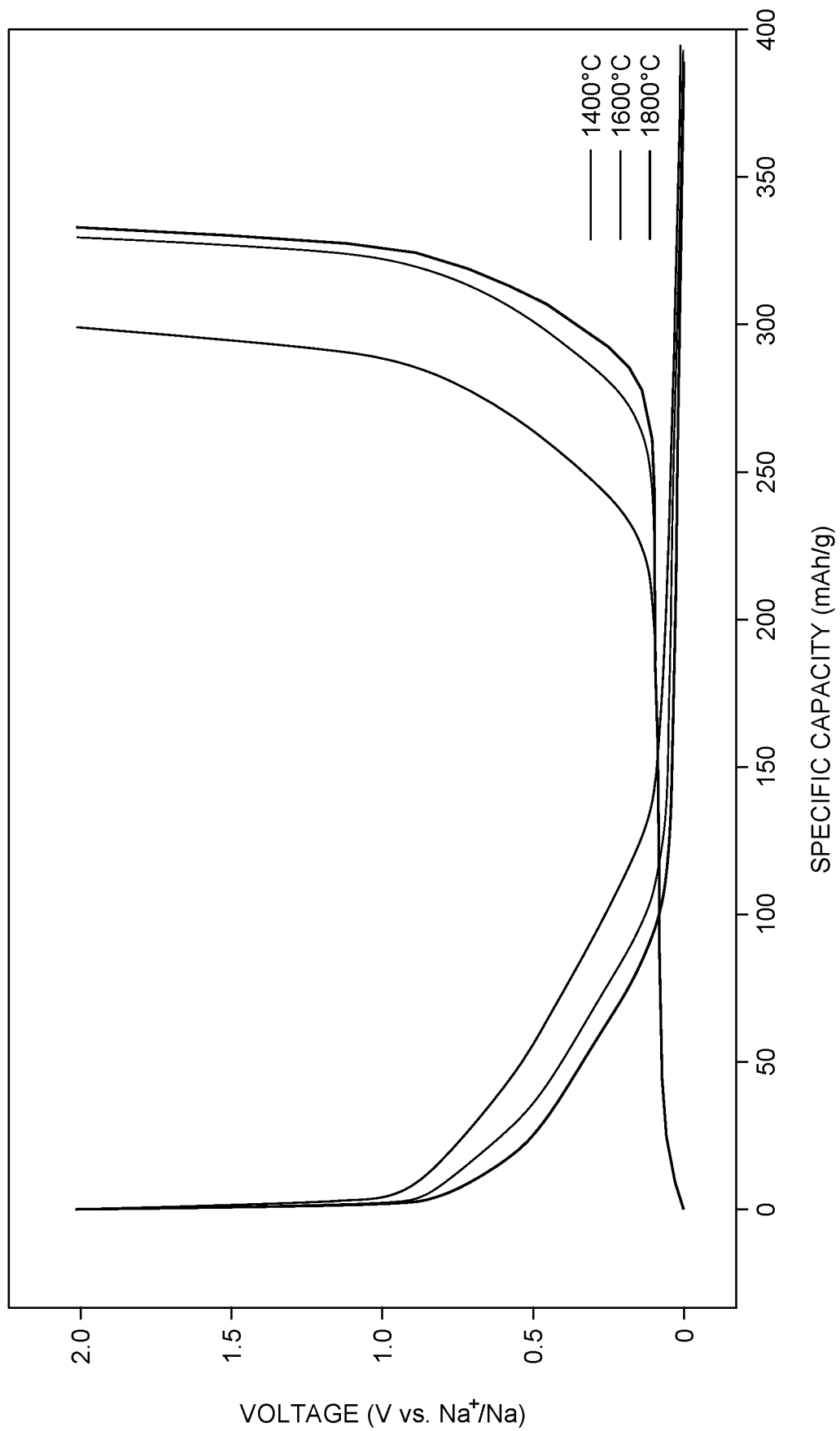
FIG. 9 is a graph showing specific capacity profiles during a first cycle of battery half-cells containing solid nano-ordered carbon products prepared by methods described and discussed herein.

With the given sulfurized slurry oil sample, oxidation and calcination were presumed to be the steps that were easy to adjust and yet could substantially affect the structure of the hard carbon product and its KPIs. Four oxidation conditions were first tested, while calcination temperature remained 1,400° C. It can be seen in FIG. 5 that variations in oxidation conditions cause variations in KPIs, however, the effects are relatively weak, and first cycle efficiency is limited to under 80%. Sulfur content measurements through combustion method (FIG. 6) reveal that although each step can effectively reduce sulfur content in the sample, there is still about 1% sulfur even after calcination at 1,400° C. It is reasonable to ascribe the low first cycle efficiency to sulfur residue, as sulfur can react with sodium (which is the basis of sodium-sulfur batteries). With increased calcination temperatures at 1,600° C. and 1,800° C. at constant oxidation condition of 300° C. for 8 hours, both KPIs see considerable improvements (FIG. 7). A reversible capacity of 333 mAh/g and first cycle efficiency of 85.6% have been achieved with calcination at 1,800° C. that surpass Faradion's KPI targets. XRD spectra (FIG. 8) show that higher calcination temperature leads to smaller d-spacing (Table 2), consistent with hard carbon from oxidized precursor that speculates a concurrent increase in pore volume responsible for plateau capacity, as observed here (FIG. 9).

TABLE 2

| Batch | Oxidation Condition | Carbonization Temperature (° C.) | Reversible Capacity (mAh/g) | First Cycle Efficiency (%) | D spacing (Å) |
| --- | --- | --- | --- | --- | --- |
| 1 | 300° C., 3 h | 1,400 | 276.2 | 75.3 | 3.69 |
| 2 | 300° C., 8 h | 1,400 | 300.3 | 78.0 | 3.77 |
| 3 | 300° C., 8 h | 1,600 | 329.6 | 83.9 | 3.66 |
| 4 | 300° C., 8 h | 1,800 | 333.2 | 85.6 | 3.60 |
| 5 | 300° C., 12 h | 1,400 | 302.6 | 77.7 | N/A |
| 6 | 325° C., 8 h | 1,400 | 307.5 | 77.3 | N/A |
| 7 | 325° C., 12 h | 1,400 | 299.3 | 74.6 | N/A |

Table 3 summarizes and compares some key specifications of samples produced through oxidation and sulfurization processes. The latter sample apparently has reversible capacity and first cycle efficiency both higher than those from oxidation process. The Brunauer-Emmett-Teller (BET) surface area of the sample is greater, and d-spacing lower, than the oxidation samples, while its particle size is in between them.

TABLE 3

| Hard Carbon Type | Oxidation (general purpose) | Oxidation (high energy) | Sulfurization |
| --- | --- | --- | --- |
| D50 (μm) | 11.1 | 6.9 | 8.9 |
| d002 (Å) | 3.65 to 3.75 | 3.6 to 3.7 | 3.6 |
| BET ($N_2$, $m^2/g$) | <5 | <2 | 15.4 |
| Tap Density (g/cc) | 0.75 to 0.8 | 0.8 | N/A |
| Capacity (mAh/g) | 295 | 299 | 333 |
| Efficiency (%) | 84.4 | 85.2 | 85.6 |

While the aforementioned cell testing results were from a protocol with 0 V discharge cutoff voltage, based on the results of sample evaluation with Faradion, it was found that deliverable capacity at a 10 mV cutoff voltage instead of total capacity is a key factor to ensure high energy density in full cells. Therefore, two additional sets of cells were made using the 1,800° C.-calcined sample and tested following two other different protocols respectively: Cell #2 used a cutoff voltage of 10 mV throughout all cycles, while Cell #3 used 0 V cutoff voltage for the first cycle and then 10 mV for following cycles. The results are recorded in Table 4 for comparison with those from the regular protocol with 0 V cutoff voltage (denoted as Cell #1). It can be seen from Cell 2 and Cell 3 that an initial cell conditioning cycle with 0 V cutoff voltage does not cause much difference in reversible capacity; there is a drop of about 60 mAh/g in reversible capacity using 10 mV cutoff voltage, which is still close to Faradion's target.

TABLE 4

| Cell | Cutoff Voltage | Reversible Capacity (mAh/g) | First Cycle Efficiency (%) |
|---|---|---|---|
| 1 | 0 V all cycles | 333 | 85.6 |
| 2 | 10 mV all cycles | 274 | 84.4 |
| 3 | 0 V @ 1$^{st}$ cycle, then 10 mV | 276 | 85.9 |

While the foregoing is directed to embodiments of the disclosure, other and further embodiments may be devised without departing from the basic scope thereof, and the scope thereof is determined by the claims that follow. All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise, whenever a composition, an element, or a group of elements is preceded with the transitional phrase "comprising", it is understood that the same composition or group of elements with transitional phrases "consisting essentially of", "consisting of", "selected from the group of consisting of", or "is" preceding the recitation of the composition, element, or elements and vice versa, are contemplated. As used herein, the term "about" refers to a +/−10% variation from the nominal value. It is to be understood that such a variation can be included in any value provided herein.

Certain embodiments and features have been described using a set of numerical minimum values and a set of numerical maximum values. It should be appreciated that ranges including the combination of any two values, e.g., the combination of any minimum value with any maximum value, the combination of any two minimum values, and/or the combination of any two maximum values are contemplated unless otherwise indicated. Certain minimum values, maximum values, and ranges appear in one or more claims below.

What is claimed is:

1. A method for preparing a carbon anode material, comprising:
   exposing a liquid refinery hydrocarbon product to a first functionalization agent to produce a first solid functionalized product during a first functionalization process, wherein each of the first functionalization agent and the first solid functionalized product comprises sulfur;
   purifying the first solid functionalized product during a purification process;
   exposing the first solid functionalized product to a second functionalization agent to produce a second solid functionalized product during a second functionalization process, wherein the second functionalization agent comprises oxygen, and wherein the second solid functionalized product comprises sulfur and oxygen; and
   carbonizing the second solid functionalized product to produce the carbon anode material.

2. The method of claim 1, wherein the liquid refinery hydrocarbon product comprises a fluid catalytic cracking (FCC) slurry oil, a heavy hydrocarbon stream comprising polyaromatic hydrocarbons, a coker gas oil, a vacuum or distillation gas oil, an ethylene tar, a coal tar, a cracking fluid, or any combination thereof.

3. The method of claim 1, wherein the liquid refinery hydrocarbon product has a boiling point of about 260° C. to about 704° C., an average molecular weight of about 100 to about 400, and an average number of aromatic rings of 2 to about 10.

4. The method of claim 1, wherein a reaction mixture comprising the liquid refinery hydrocarbon product and the first functionalization agent is heated to a process temperature of about 100° C. to about 400° C. during the first functionalization process.

5. The method of claim 1, wherein the first functionalization agent comprises elemental sulfur ($S_8$), carbon disulfide, a thiol, an organic sulfide, a metal sulfide, or any combination thereof.

6. The method of claim 1, wherein the first solid functionalized product comprises about 10 wt % to about 50 wt % of sulfur.

7. The method of claim 1, wherein the first solid functionalized product is exposed to a solvent extraction during the purification process.

8. The method of claim 1, wherein a contaminant is separated from the first solid functionalized product during the purification process, and wherein the contaminant comprises an aromatic or polyaromatic compound, a paraffinic compound, or a combination thereof.

9. The method of claim 1, wherein the second functionalization agent is selected from the group consisting of oxygen gas ($O_2$), air, or oxygen-enriched air, hydrogen peroxide, sulfuric acid, nitric acid, and combinations thereof.

10. The method of claim 1, wherein a reaction mixture comprising the first solid functionalized product and the second functionalization agent is heated to a process temperature of about 200° C. to about 400° C. during the second functionalization process.

11. The method of claim 1, wherein the first functionalization agent comprises elemental sulfur ($S_8$), and wherein the second functionalization agent comprises oxygen gas ($O_2$), air, or oxygen-enriched air.

12. The method of claim 1, wherein the second solid functionalized product comprises about 10 wt % to about 25 wt % of sulfur and about 5 wt % to about 30 wt % of oxygen.

13. The method of claim 1, wherein the second solid functionalized product is heated to a temperature of about 1,000° C. to about 2,900° C. during the carbonization process.

14. The method of claim 1, further comprising exposing an initial refinery hydrocarbon product to a fractionation process prior to the first functionalization process to remove a light hydrocarbon cut having a boiling point range from about 50° C. to about 370° C. and produce the liquid refinery hydrocarbon product.

15. The method of claim 14, wherein the liquid refinery hydrocarbon product has a boiling point of greater than 370° C.

16. A method for preparing a solid carbon anode material, comprising:
    heating an initial refinery hydrocarbon product to remove a light hydrocarbon cut having a boiling point range from about 50° C. to about 370° C. from a liquid refinery hydrocarbon product during a fractionation process, wherein the liquid refinery hydrocarbon product has a boing point of greater than 370° C.;
    exposing the liquid refinery hydrocarbon product to a first functionalization agent to produce a first solid functionalized product during a first functionalization process, wherein each of the first functionalization agent and the first solid functionalized product comprises sulfur;

purifying the first solid functionalized product by a solvent extraction during a purification process;

exposing the first solid functionalized product to a second functionalization agent to produce a second solid functionalized product during a second functionalization process, wherein the second functionalization agent comprises oxygen, and wherein the second solid functionalized product comprises sulfur and oxygen; and carbonizing the second solid functionalized product to produce the solid carbon anode material.

17. The method of claim 16, wherein the first functionalization agent comprises elemental sulfur ($S_8$), and wherein the second functionalization agent comprises oxygen gas ($O_2$), air, or oxygen-enriched air.

18. The method of claim 16, wherein the second solid functionalized product comprises about 10 wt % to about 25 wt % of sulfur and about 5 wt % to about 30 wt % of oxygen.

19. A method for preparing a carbon anode material, comprising:

exposing a liquid refinery hydrocarbon product to a first functionalization agent to produce a first solid functionalized product comprising sulfur during a first functionalization process, wherein the first functionalization agent comprises elemental sulfur ($S_8$), carbon disulfide, a thiol, an organic sulfide, a metal sulfide, or any combination thereof;

purifying the first solid functionalized product during a purification process;

exposing the first solid functionalized product to a second functionalization agent to produce a second solid functionalized product during a second functionalization process, wherein the second functionalization agent comprises oxygen gas ($O_2$), air, or oxygen-enriched air, and wherein the second solid functionalized product comprises sulfur and oxygen; and carbonizing the second solid functionalized product to produce the solid carbon anode material.

* * * * *